(12) United States Patent
Ronay (10) Patent No.: US 6,641,632 B1
(45) Date of Patent: Nov. 4, 2003

(54) POLISHING COMPOSITIONS AND USE THEREOF

(75) Inventor: Maria Ronay, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/295,836

(22) Filed: Nov. 18, 2002

(51) Int. Cl.⁷ .............................. C09G 1/02; C09G 1/04
(52) U.S. Cl. .............................. 51/309; 51/307; 51/308; 51/298; 106/3
(58) Field of Search .................. 51/307, 308, 309, 51/298; 106/3

(56) References Cited

U.S. PATENT DOCUMENTS

| | | | | |
|---|---|---|---|---|
| 3,607,160 A | * | 9/1971 | Makino et al. | 51/304 |
| 3,816,086 A | * | 6/1974 | Ceremsak et al. | 51/308 |
| 5,407,615 A | * | 4/1995 | Norville | 264/36.1 |
| 5,443,604 A | * | 8/1995 | Stowell | 51/307 |
| 5,876,490 A | | 3/1999 | Ronay | |
| 6,200,202 B1 | * | 3/2001 | Eastman et al. | 451/99 |
| 6,224,464 B1 | | 5/2001 | Nojo et al. | |

OTHER PUBLICATIONS

Freudenthal et al, Second order effects in dissipative media, Proc. Roy. Soc. A292, 14 (1966) (no month).

* cited by examiner

*Primary Examiner*—Michael Marcheschi
(74) *Attorney, Agent, or Firm*—Connolly Bove Lodge & Hutz, LLP; Robert M. Trepp (57) ABSTRACT

Slurry compositions comprising abrasive particles and solid lubricant particles are useful for planarizing surfaces, and preventing delamination and scratches.

16 Claims, 8 Drawing Sheets

FIG. 9

POLISHING COMPOSITIONS AND USE THEREOF

TECHNICAL FIELD

The present invention relates to slurry compositions. The slurry compositions are useful for polishing and especially for planarizing surfaces in the microelectronics industry. More particularly the present invention relates to increasing the topological selectivity of planarizing compositions by employing slurry compositions containing solid lubricant particles. An added advantage of such slurry compositions is that the reduced friction reduces delamination (peeling) due to polishing, which is particularly important in polishing low k and porous low k dielectrics, and reduces defects such as scratches.

BACKGROUND OF THE INVENTION

In the fabrication of microelectronics components, a number of steps involved are polishing, especially surfaces for chemical-mechanical polishing for the purpose of recovering a selected material and/or planarizing the structure. Accordingly, over the years, a number of vastly different types of polishing processes to remove material, sometimes in selective areas, have been developed and are utilized to varying degrees.

For instance, in microelectronics planarization metal or insulator layers are deposited conformably into etched trenches of a substrate after which a need exists to planarize the surface with chemical mechanical planarization (CMP). With device dimensions becoming smaller and smaller involving not only narrower lines but also thinner layers both in front-end, and back-end of the line applications, post CMP specifications for permissible deviation from perfect planarity are becoming tighter. The deviation from perfect planarity, referred to as a step, is detrimental due to depth-of-focus issues in subsequent lithography steps. Also, this deviation in the case of oxide polish can lead to field threshold problems in isolation regions, while in the case of metal polish can cause shorts in the next metal level. For devices manufactured in the near future it is important to achieve a post-planarization step-height of less than 100 Angstroms on a 100 microns×100 microns test site. Another important issue is surface damage, such as, peeling and scratches, particularly in polishing low k and porous low k dielectrics.

SUMMARY OF THE INVENTION

The present invention provides for improving the topological selectivity of the polishing by including solid lubricant particles in the polishing composition. This is achievable by the present invention in a single step CMP process without the need for any auxiliary process steps or auxiliary filling structures.

More particularly, an aspect of the present invention relates to a polish composition comprising abrasive particles and about 0.03% to about 10% by weight of solid lubricant particles.

Another aspect of the present invention relates to a method for polishing a surface by providing on the surface a liquid slurry composition comprising abrasive particles and solid lubricant particles in an amount sufficient to increase the topological selectivity of the composition when contacting the surface with a polishing pad; and contacting the surface with a polishing pad.

A still further aspect of the present invention relates to a method for polishing a surface by providing on the surface a liquid slurry composition comprising solid lubricant particles in an amount sufficient to reduce scratching and/or delamination when polishing thin films; and polishing said surface. The thin films are typically 2 $\mu$m or less.

Other objects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BRIEF DESCRIPTION OF THE DRAWINGS

FIG. 1b' illustrates a structure with dishing due to the planarization.

FIG. 6 shows a patterned surface having up and down area during planarization when a). the pad does not touch and b). when it does touch the bottom surface of the down area. Wafers are upside down during planarization.

BEST AND VARIOUS MODES FOR CARRYING OUT INVENTION

According to the present invention a polishing slurry that contains abrasive particles. and solid lubricant particles is provided. The solid lubricant particles enhance the topological selectivity of the polishing. In addition, by reducing the friction of the polishing process it reduces the occurrence of thin film delamination and scratching.

Examples of suitable solid lubricant particles are inorganic materials such as molybdenum disulfide, molybdenum diselenide, tungsten disulfide, tungsten diselenide, niobium disulfide, niobium diselenide, graphite, and organic polymers such as poly(tetrafluoroethylene) (PTFE); fluoroethylene-propylene copolymers (FEP), perfluoroalkoxy resins (PFA) and polyvinylidene fluoride (PVDF).

The preferred lubricants are the organic materials and the most preferred are virgin polytetrafluoroethylene particles. Polytetrafluoroethylene is preferred because of its very low coefficient of friction (0.03–0.1) and its chemical inertness.

The inorganic lubricants are not especially preferred since certain of them such as the disulfides and disilenides may form corrosive acids by hydrolysis, and graphite may promote corrosion by galvanic action.

The lubricant particles typically have a function coefficient of less than about 0.3 and more typically about 0.03 to about 0.1.

The particle size of the lubricant particles is typically about 0.05 to about 18 microns and more typically about 0.05 to about 0.5 micron. A typical average particle size is about 0.2 micron.

The preferred organic polymers typically have weight average molecular weights about $1\times10^5$ to about $5\times10^5$, and more typically about $2\times10^5$ to about $3\times10^5$.

Aqueous dispersions of PTFE particles in water stabilized by wetting agents are commercially available. They contain 3–6 weight percent of a nonionic or anionic wetting agent or dispersant (stabilizer). By way of example, in the present application, FLUOTRON 110 from Carroll Scientific was used, which has 0.2 $\mu$m average virgin PTFE particle size at a pH of 7.5.

The polishing compositions typically contain about 0.03 to about 10% by weight, more typically about 0.5 to about 5% by weight and preferably about 1 to about 3% by weight of the lubricant particles.

The compositions can also contain a surfactant to keep the lubricant particles suspended in the composition.

The surfactant, when present, is typically anionic or nonionic. Specific examples of suitable surfactants can be determined by those of ordinary skill in the art once aware of this disclosure and need not be discussed to any further extent in this application.

The amount of surfactant, when present, is typically about 3 to about 6% by weight of the lubricant particles.

Examples of suitable abrasive particles include alumina, ceria, silica, titania, zirconia, polymer particles, organic/inorganic composite particles or combinations thereof. The abrasives typically have a particle size of about 30 to about 1000 nanometers and preferably about 75 to about 300 nanometers.

The amount of abrasive particles is typically about 0.1 to about 20 percent by weight and more typically about 0.3 to about 2 percent of weight.

The slurry can include other ingredients in addition to the abrasive, solid lubricant particles and surfactants such as oxidizing agents, preservatives, anticorrosion agents and the like.

The slurry is preferably a aqueous slurry, though non-water-based slurries or a mixture of water based and non-water-based slurries are included in the present invention.

The parameters of the polishing or planarizing can be determined by those skilled in the art, once aware of this disclosure, without exercising undue experimentation. For instance, the speed of rotation of the polishing pads and also of the wafer is about 10 to about 150 rpm and pressure about 2 to 10 psi. A wafer may be in the range of 100 to 300 mm in diameter.

Figure 1A:
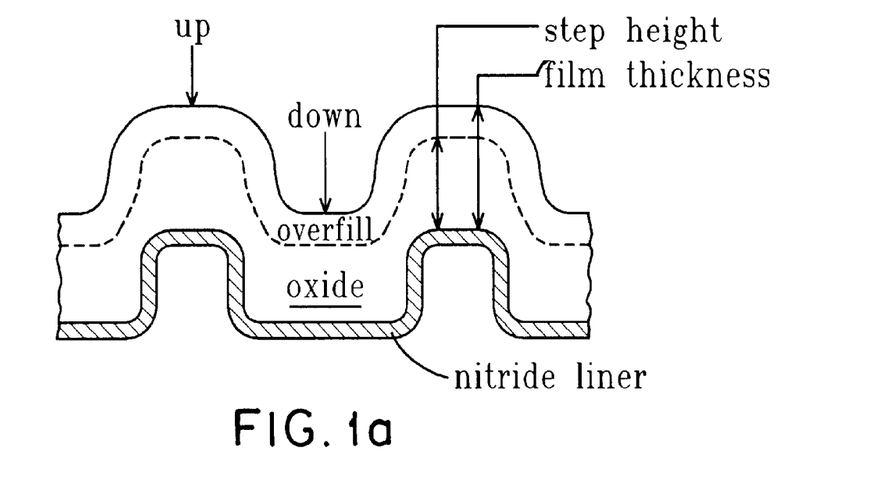
FIG. 1a illustrates a structure before planarization.
Figure 1B:
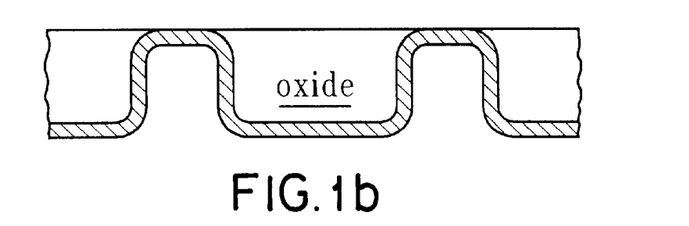
FIG. 1b illustrates a structure after "perfect" planarization.

To facilitate a further understanding of the present invention, reference is made to the figures. For an example, a shallow trench isolation (STI) structure is shown in FIG. 1a before planarization. In order to achieve perfect planarization, a CMP process is required which has a high degree of topological selectivity meaning that it removes material from the "up" areas on the wafer, but it does not remove material from the "down" areas of the wafer until the level of the up area reaches the level of the down area as shown in FIG. 1b. If material is removed from the down area before it becomes level with the up area, "dishing" results i.e. a post CMP step Will remain as shown in FIG. 1b'. With a large overfill, where overfill is film thickness minus step height, the dishing maybe reduced provided the cumulative removal rate in the down area for the overfill equals the cumulative removal rate of the total film in the up area.

Figure 2:
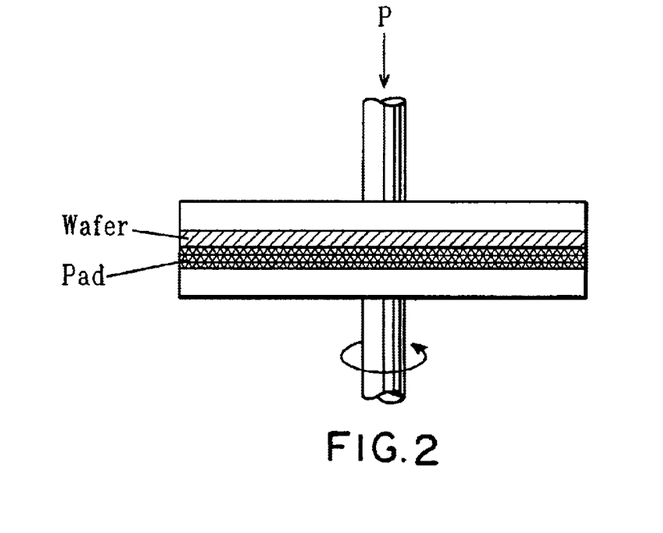
FIG. 2 illustrates a parallel plate arrangement for rheological testing.

In order to achieve a perfect topological selectivity, it would be desirable to understand the mechanism by which the down area polishes. It is well known that significant polish rates result only in cases where the polishing pad is in contact with the wafer. Understanding the mechanism by which the polishing pad extends in the down area of the wafer would therefore be desirable. Accordingly, rheological experiments were made in the parallel plate configuration presented in FIG. 2. The two parallel plates are 25 mm in diameter. A 25 mm diameter disk was cut out from the most commonly used polishing pad, IC1000 K-GR, a foam polyurethane pad from Rodel corporation, which is 1.34 mm thick and has adhesive backing. This was attached-to the bottom plate, while a 28 mm diameter patterned silicon wafer with an $SiO_2$ film-on it was borided to the top plate. Axial loads of various magnitudes were applied in the different tests. The bottom plate was rotated in contact with the stationary wafer. Shear rate was varied by varying the revolution of the bottom plate. Shear rate depends linearly on the rate of rotation times the radius of the pad and inversely on pad thickness. The torque between the pad and the wafer was varied by either varying the shear rate or varying the down force P. The torque between the pad and the wafer is the indicator of the friction created between the pad and the wafer.

Figure 3:
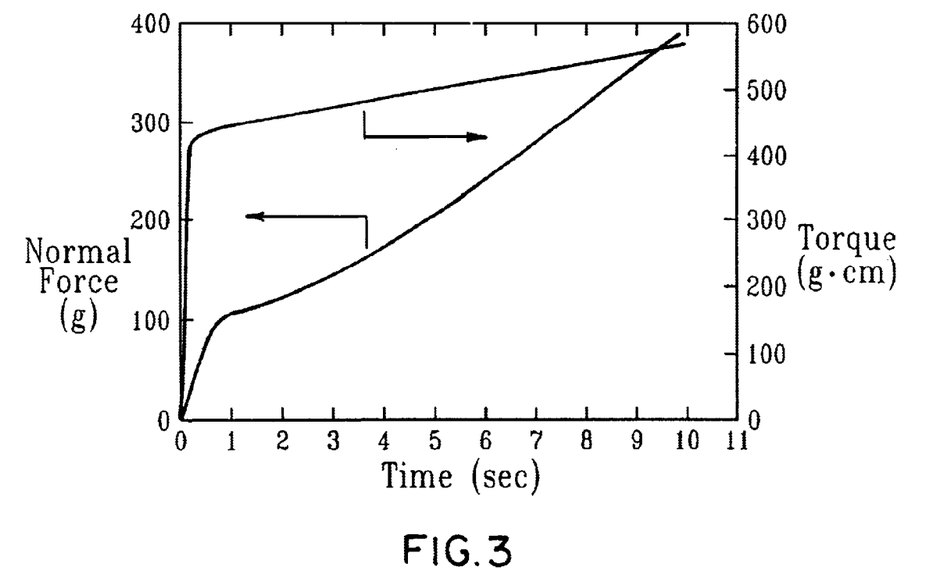
FIG. 3 is a graph showing torque and second order normal force as a function of time in a dry condition.

FIG. 3 shows the torque as a function of time in the case the pad and wafer are rubbed against each other in the dry condition. An axial load of 1280 g was applied while the shear rate was 600 reciprocal seconds. It is seen that the average value of the torque between 9 and 10 seconds went up to 567 g-cm. This torque created a second order tensile normal force in the polyurethane pad. If this tensile normal force is not counteracted by increasing the compressive force that was applied initially, the pad would extend in the vertical direction. Since the experiments were run in a mode which keeps the gap (pad thickness) between the parallel plates constant, an additional 370 g compressive normal force was applied by the rheometer that was necessary to prevent the pad from extending in the vertical direction. This additional normal force is also shown in FIG. 3. The tensile normal force created in the pad by the torque is a second order effect and therefore it depends on the square of the torque. See Freudenthal and Ronay, Proc. Roy. Soc. A292, 14 (1966).

Figure 4:
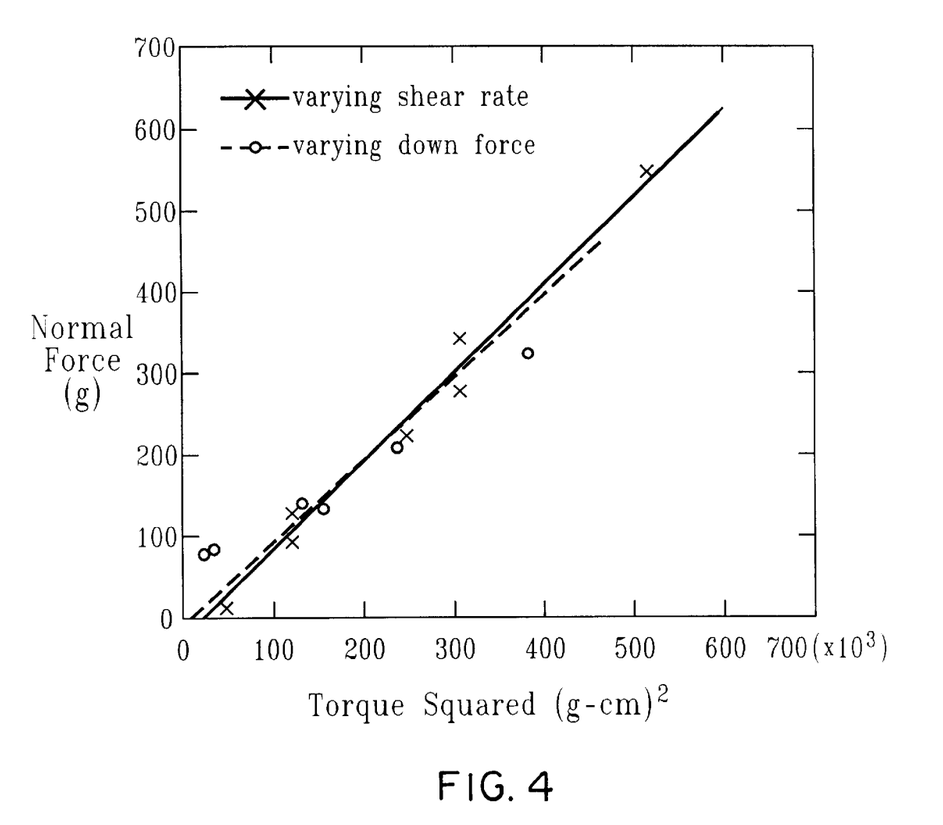
FIG. 4 illustrates the second order normal force as a function of the square of the torque in the dry condition.

FIG. 4 shows that whether the torque was increased by increasing the initial down force or by increasing the shear rate, the second order normal force is a linear function of the square of the torque with a slope of $1\times10^{-3}$ g/(g.cm)$^2$ in the dry condition.

Next the pad was wetted with 3 drops of an aqueous ceria slurry consisting of 0.75 wt. % ceria particles of 0.27 micron average diameter at a neutral pH.

Figure 5:
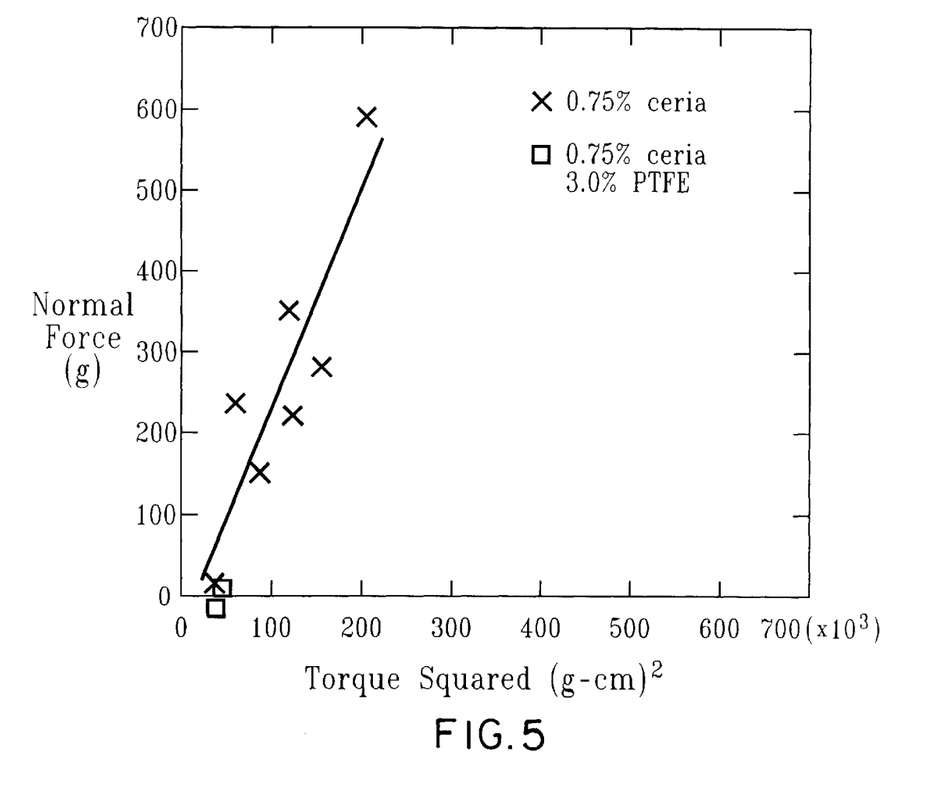
FIG. 5 shows the second order normal force as a function of the square of the torque using a ceria slurry and a composition of the present invention.

Several experiments were carried out using always a new pad and a new wafer, the torque and the normal force were measured. The results are presented in FIG. 5. It is seen that the second order normal force created by the torque between the pad and the wafer is larger than it was in the dry condition. FIG. 5 shows that the normal force is again a linear function of the square of the torque as it was in the dry condition, but the slope is larger, $2.7 \times 10^{-3}$ g/(g.cm)$^2$ as compared to $1 \times 10^{-3}$ g/(g.cm)$^2$. The rheology measurements are giving the second order tensile normal force, which, of course, is causing a second order tensile extension of the pad. This, however, cannot be measured with the rheology test; therefore they were estimated with carefully planned polishing experiments.

Figure 6A:
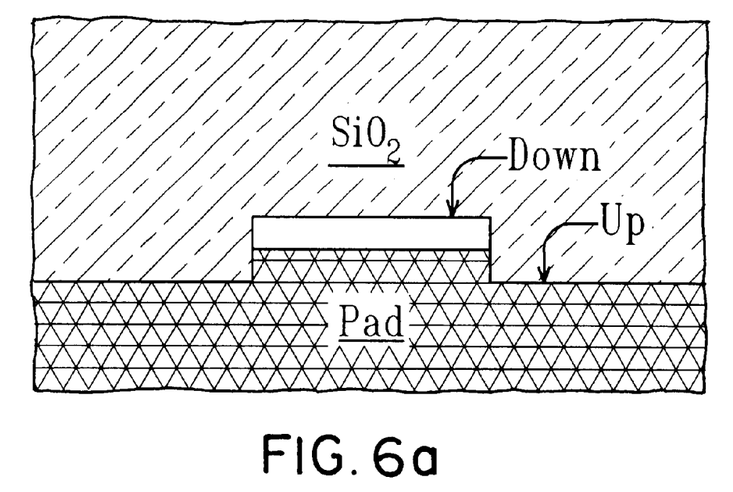
Figure 6B:
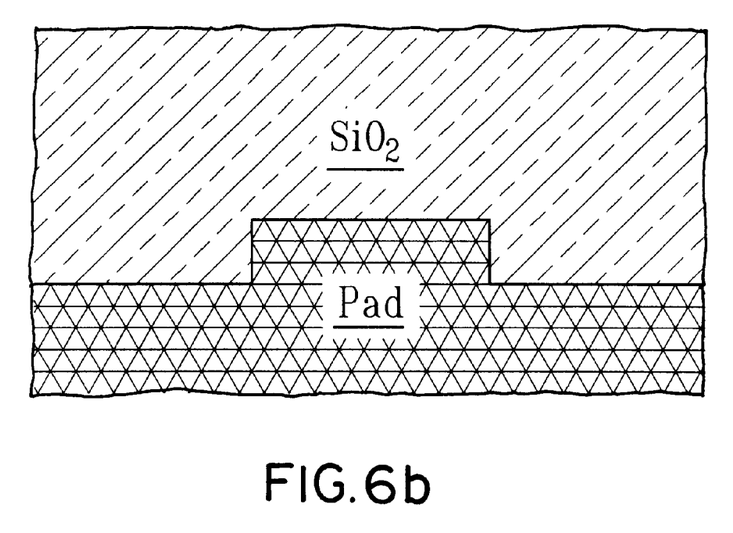
Figure 7:
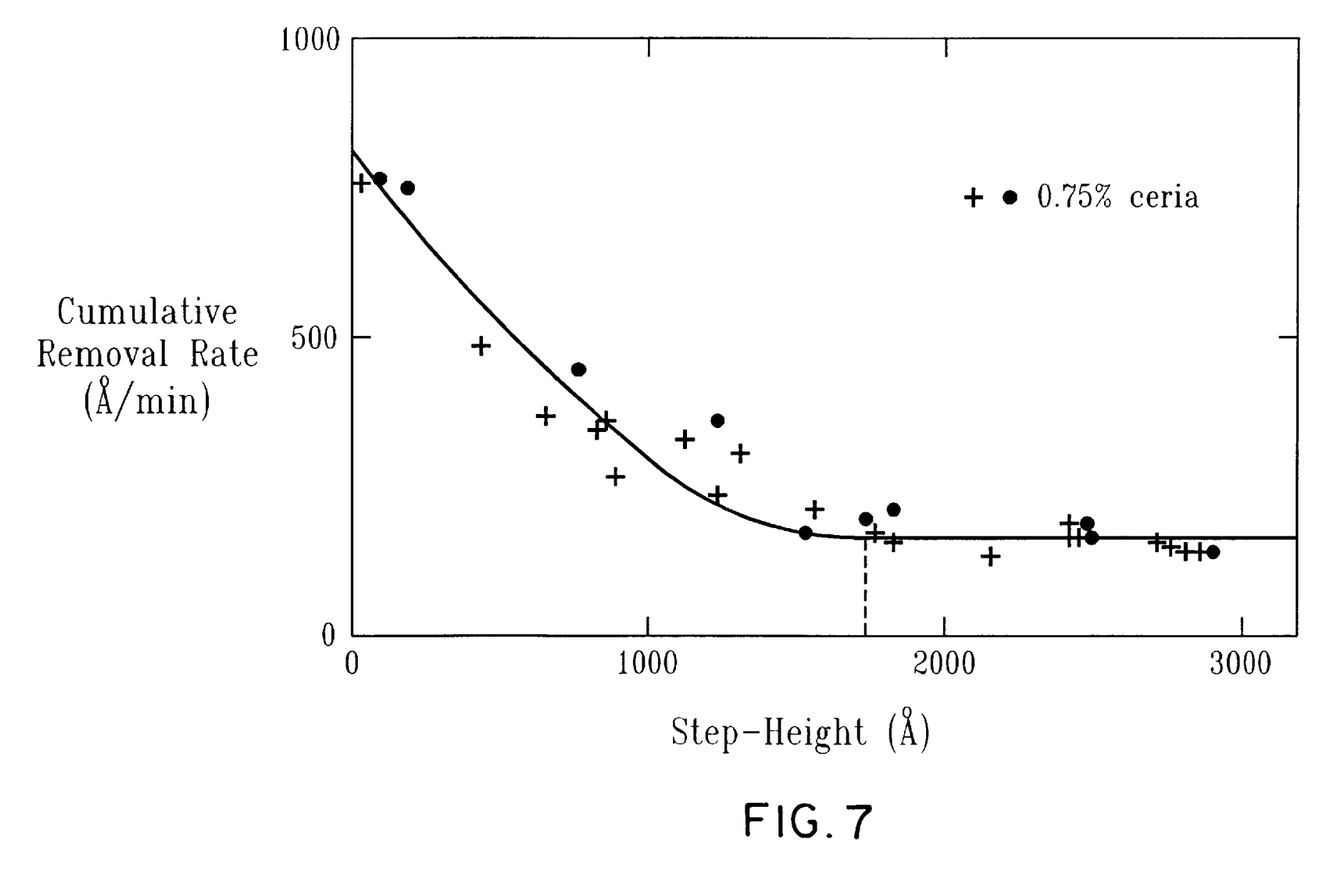
FIG. 7 shows the cumulative polish rate of down area as a function of step-height using a ceria slurry.

In order to estimate the magnitude of the second order extension of the pad in the vertical direction, perpendicular to the plane of the pad and into the down areas of the wafer, polishing experiments on a Westech 372 polishing tool using the same pad, the same slurry and the same wafer structure—but in a 200 mm diameter size—as they were used in the rheology tests were conducted. 350 g/cm$^2$ down force and 100 rpm revolution of the polishing table and 100 rpm revolution on the wafer carrier was used. Polishing several wafers for different times it was recommended that the cumulative polishing rate in the down area of a 100 micron×100 micron test structure as a function of step-height was determined. The oxide thickness in the down area was measured with a TFI thin film optical spectrometer by Tencor and step-height with a P-11 Profilometer of KLA Tencor. The polishing rate is assumed to be slow when the pad does not touch the down area representing hydrodynamic conditions (FIG. 6a) and fast when it does (FIG. 6b). In FIG. 7 the cumulative polish rate of the down area as a function of step-height using the 0.75 wt. % ceria slurry is shown. A transition from a slow to a fast polishing rate occurs at about 1700 Angstroms step-height, from which it is concluded that the pad extended into the down area by the second order extension by about 1700 Angstroms.

According to the present invention, the second order normal force and the accompanying second order extension of the polishing pad into the down areas of the wafer is reduced. As seen in FIG. 5 normal force is a very sensitive function of the torque, thus the way to reduce the normal force is to reduce the torque i.e. to reduce the friction between polishing pad and wafer.

A slurry is prepared by diluting a commercially available aqueous PTFE suspension, FLUOTRON 110 from Carroll Scientific, Inc., under vigorous stirring to a concentration that gave 3.0 wt. % in the finished slurry. The PTFE particles were 0.2 micron in diameter, have a molecular weight of $2 \times 10^5$ to $3 \times 10^5$ and were stabilized with an anionic surfactant. The suspension had a neutral pH. Subsequently added under continuous stirring to the PTFE suspension is in an aqueous ceria slurry in an amount that gave a ceria concentration of 0.75 wt % in the finished slurry. The pH of this slurry remained neutral.

Rheological experiments were conducted while wetting the polishing pad with 3 drops of the slurry. In the experiments a shear rate of 500 reciprocal seconds and an initial down force of 1240–1266 g was applied. The torque measured between 9 and 10 seconds was in every case less than 200 g.cm indicating that the addition of 3 wt. % PTFE significantly reduced the torque as compared to the torque created without the PTFE additive.

The second order normal force was a maximum of 4 g, and in some experiments totally absent (−13 g). The torque and normal force values are also plotted in FIG. 5.

Figure 8:
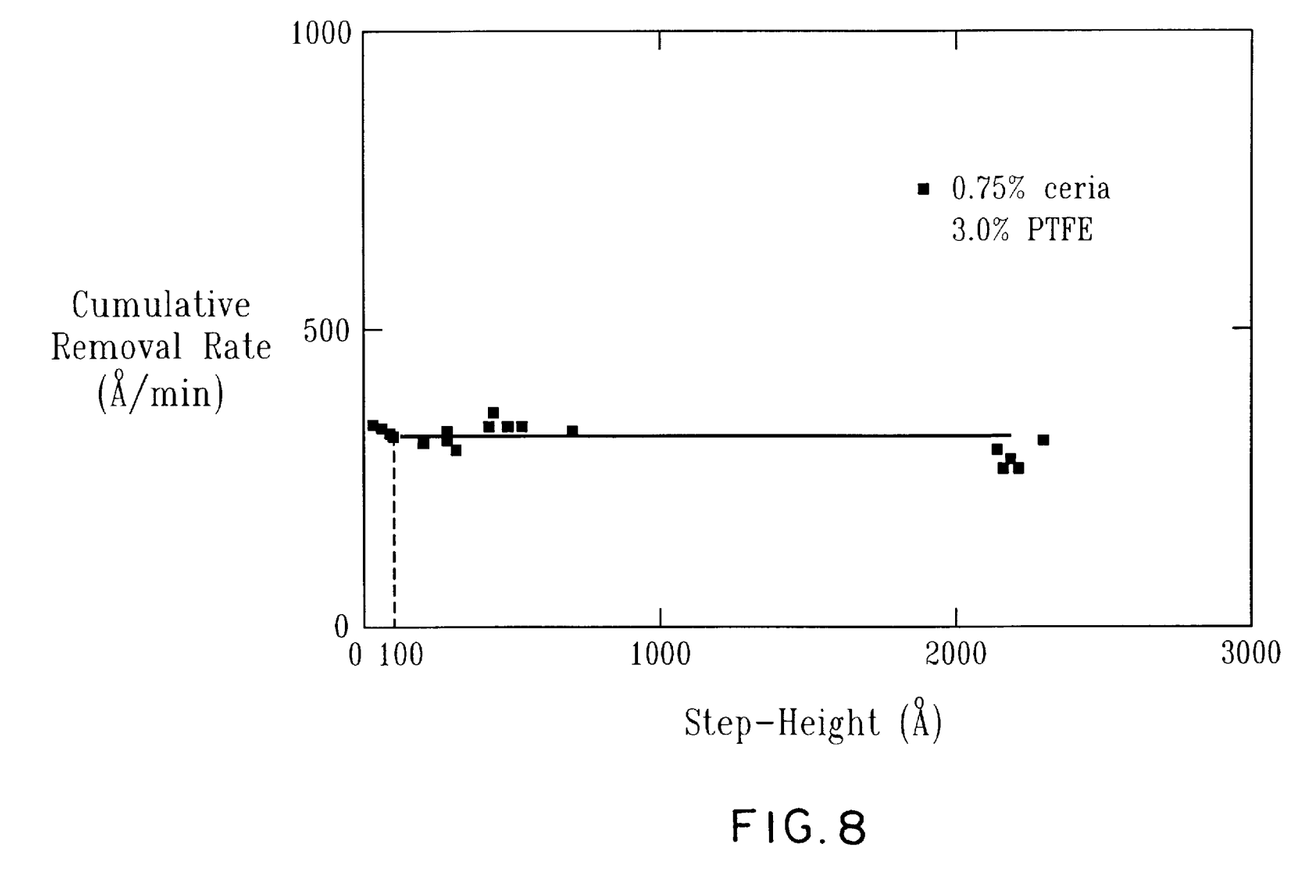
FIG. 8 illustrates the cumulative polish rate of down area as a function of step-height using a composition of the present invention.
Figure 9:
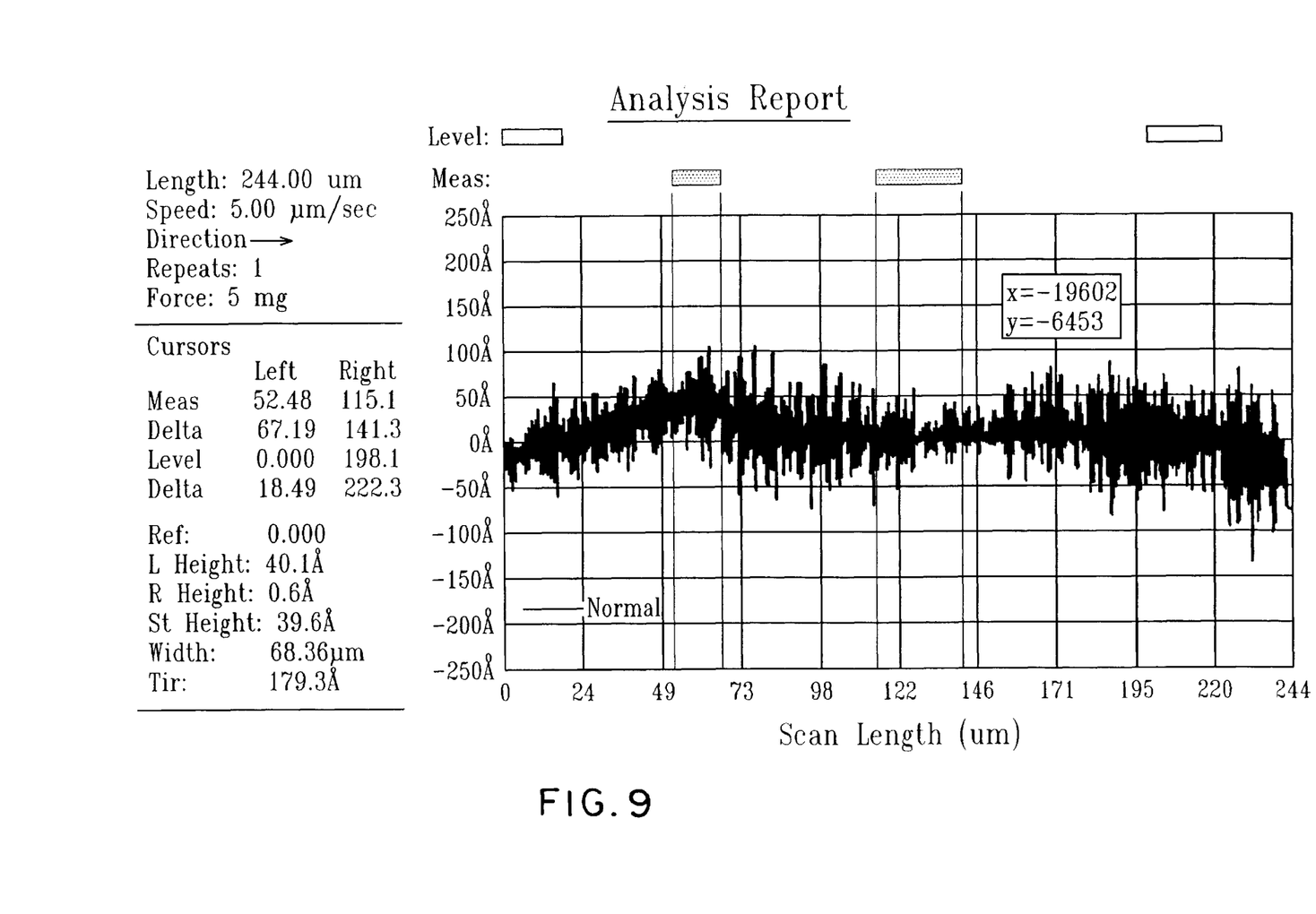
FIG. 9 illustrates post CMP dishing on a 100 $\mu$m×100 $\mu$m test structure.

The results of polishing experiments using the 0.75 wt.5% ceria and 3.0 wt. % PTFE slurry are shown in FIG. 8, presenting the cumulative removal rate of the down area in the test site as a function of step-height. The results show a steady polish rate at every step-height with possibly a small rate at 100 Angstroms step-height, though the rates are within the experimental scatter. These results should be compared with that of FIG. 7. While there the pad extended to 1700 Angstroms into the down area of the wafer, when the PTFE additive was used, the pad did not extend into the down area of the wafer, or if it did, it was just with 100 Angstroms implying that in the presence of PTFE particles in the slurry no second order extension was created in the pad. Post CMP measurements on the 100 micron×100 micron test site showed a dishing of less than 100 Angstroms deep. FIG. 9 shows a post CMP dishing of 40 Angstroms on a 100 micron×100 micron test site on a wafer that had initially a 3600 angstroms step height and 4900 angstroms high density plasma SiO$_2$ film on it, thus a 1300 angstroms overfill. Such overfill is necessary because the removal rate in the down area under hydrodynamic conditions increased from the PTFE particles.

The polishing results together-with the rheological measurements show that adding 3 wt. % PTFE particles to the polishing slurry reduces friction as indicated by a reduced torque and prevents the creation of second order normal force and second order normal extension in the polishing pad, which enhances topological selectivity and thus diminishes post CMP dishing. In further experiments a ceria slurry with 2 wt. % PTFE additive was prepared and the topological selectivity was similar to that achieved with 3 wt. % PTFE additive. A 1 wt. % PTFE additive produced a better planarization than prior art planarizing slurries, but not as high topological selectivity as slurries with 2 wt. % and 3 wt. % PTFE additive.

Because planarizing processes utilize friction, reducing friction by adding a lubricant to the slurry may reduce the polish rate. The polish rate for High Density Plasma SiO$_2$ under the given experimental conditions was 2000 Angstroms per minute for the 0.75 wt. % ceria slurry, 2200 Angstrom per minute for 0.75 wt. % ceria and 1 wt. % PTFE slurry and 1250 Angstrom per minute for the 0.75 wt. % ceria and 3.0 wt. % PTFE slurry, the later still being an economical planarizing rate for the thin oxide layers that have to be removed in future devices.

The solid lubricant particles do not adversely interfere with the polishing process. While the examples described above are for SiO$_2$, the present invention is applicable to all CMP processes to polishing metals, such as copper, tungsten, etc. and; insulators, such as SiO$_2$, low k dielectrics and porous low k dielectrics. The reduction of friction of the polishing process by the solid lubricant particles in the slurry is particularly favorable in the case of low k dielectrics where integration schemes are limited by delamination caused by the friction of CMP processes.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed as new and desired to be protected by Letters Patent of the United States is:

1. A chemical mechanical polish slurry composition suitable for microelectronics comprising abrasive particles and solid organic polymeric lubricant particles.

2. The composition of claim 1 wherein the amount of the solid organic polymeric lubricant particles is about 0.03 to about 10% by weight.

3. The composition of claim 1 wherein the solid organic polymeric lubricant particles are selected from the group consisting of poly(tetrafluoroethylene), fluoroethylene-propylene copolymers, perfluoroalkoxy resins, polyvinylidene fluoride and mixtures thereof.

4. The composition of claim 1 wherein the solid organic polymeric lubricant particles have a coefficient of friction of 0.03 to about 0.3.

5. The composition of claim 1 wherein the solid organic polymeric lubricant particles have a particle size of about 0.05 to about 18 microns.

6. The composition of claim 1 wherein the abrasive particles comprise a member selected from the group consisting of ceria, alumina, silica, titania, zirconia, polymer particles, organic/inorganic composite particles and combinations thereof.

7. The composition of claim 1 wherein the amount of the abrasive particles is about 0.1 to about 20 percent by weight.

8. The composition of claim 1 being an aqueous slurry.

9. The composition of claim 1 which further comprises a surfactant.

10. The composition of claim 1 which further comprises at least member selected from the group consisting of oxidants, preservatives and anticorrosion agents.

11. The composition of claim 1 wherein the solid organic polymeric lubricant particles comprise poly(tetrafluoroethylene).

12. The composition of claim 1 wherein the amount of the solid organic lubricant particles is about 0.5 to about 5% by weight.

13. The composition of claim 1 wherein the amount of the solid organic lubricant particles is about 1 to about 3% by weight.

14. The composition of claim 3, being an aqueous slurry and wherein the amount of the solid organic lubricant particles is about 0.03 to about 10% by weight; the solid organic polymeric lubricant particles have a particle size of about 0.05 to about 18 microns and a coefficient of friction of 0.03 to about 0.1, the amount of the abrasive particles is about 0.3 to about 20 percent by weight; and further comprising about 3 to about 6% by weight based up the weight of the lubricant particles of a surfactant.

15. The composition of claim 14 wherein the amount of abrasive is about 0.3 to about 2 percent by weight.

16. The composition of claim 2 wherein the amount of abrasive is about 0.3 to about 2 percent by weight.

* * * * *